United States Patent
Naka et al.

(10) Patent No.: US 6,314,780 B1
(45) Date of Patent: Nov. 13, 2001

(54) METHOD OF MANUFACTURING CONDUCTOR SEGMENTS OF AC GENERATOR

(75) Inventors: Yoshio Naka, Toyota; Kazuki Maesoba, Anjo; Masaru Sugiyama, Okazaki; Youichi Kamakura, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/628,418

(22) Filed: Jul. 28, 2000

(30) Foreign Application Priority Data

Aug. 4, 1999 (JP) .................................................. 11-220769

(51) Int. Cl.⁷ ....................................................... B21D 7/08
(52) U.S. Cl. ............................................... 72/213; 72/383
(58) Field of Search ........................... 72/213, 212, 383; 470/13

(56) References Cited

U.S. PATENT DOCUMENTS

| | | | |
|---|---|---|---|
| 659,111 | * 10/1900 | Soper | 72/213 |
| 2,485,495 | * 10/1949 | Kenney et al. | 72/213 |
| 2,975,820 | * 3/1961 | Huet | 72/213 |
| 3,199,549 | * 8/1965 | Wallshein | 72/213 |
| 4,446,711 | 5/1984 | Valente | 72/213 |
| 5,211,670 | 5/1993 | Ohmi et al. | |
| 5,237,847 | * 8/1993 | Owens | 72/213 |
| 5,266,858 | 11/1993 | Ohmi et al. | |
| 5,461,897 | * 10/1995 | Gray et al. | 72/213 |
| 5,551,271 | 9/1996 | Gray et al. | 72/213 |

FOREIGN PATENT DOCUMENTS

| | | |
|---|---|---|
| 55036082 | 3/1980 | (JP) . |
| 3-216216 | * 9/1991 | (JP) ............ 72/213 |

* cited by examiner

*Primary Examiner*—Lowell A. Larson
(74) *Attorney, Agent, or Firm*—Pillsbury Winthrop LLP

(57) ABSTRACT

A method of manufacturing a U-shaped conductor segment which has a U-shaped head and a pair of legs includes setting a straight conductor wire of a prescribed length on the outer peripheries of a pair of parallel rollers, and pushing a bender against one side of the conductor wire opposite the rollers between the pair of rollers so that the conductor wire can be bent to allow the bender to pass between the pair of rollers.

13 Claims, 8 Drawing Sheets

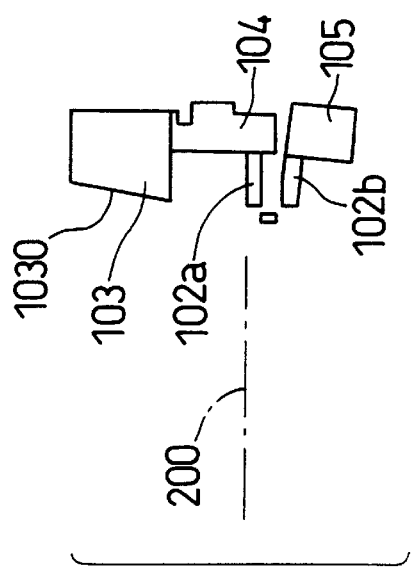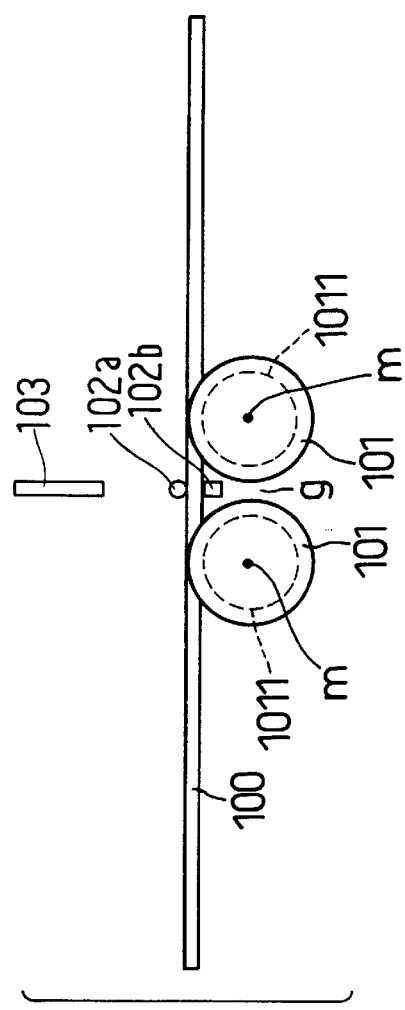

US 6,314,780 B1

METHOD OF MANUFACTURING CONDUCTOR SEGMENTS OF AC GENERATOR

CROSS REFERENCE TO RELATED APPLICATION

The present application is based on and claims priority from Japanese Patent Application Hei 11-220769, filed Aug. 4, 1999, the contents of which are incorporated herein by reference.

BACKGROUND OF THE INVENTION

1. Field of the Invention

The present invention relates to an ac generator having a plurality of U-shaped conductor segments that are connected to form a stator winding.

2. Description of the Related Art

A rotary electric machine having an armature winding which is comprised of a plurality of U-shaped conductor segments. Each conductor segment has a U-shaped head and a pair of legs and is coated with an insulation layer.

U.S. Pat. Nos. 5,211,670 and 5,266,858 disclose a method of manufacturing such an armature winding. Each leg is inserted into one of a plurality of slots from one end of an armature core. Thereafter, leg ends of the conductor segments are connected to one another at the other end of the armature core to form the stator winding.

In manufacturing the conductor segments, a rotating disk having a bend core and a pin is provided. The bend core is formed at the center of a rotating disk to be fitted to the inner periphery of the U-shaped head of the conductor segment. A straight conductor wire is put between the outer periphery of the bend core and the pin, and, then, the disk is rotated in a certain angle to bend the wire along the outer periphery of the bend core.

However, the above manufacturing method causes the U-shaped head to incline to one of the legs, and the head has to be reshaped in order to form a coil end of the armature winding. This is an obstacle to productivity of the armature winding, and the reshaping of the conductor segments may cause insulation failure.

SUMMARY OF THE INVENTION

A main object of the invention is to provide an improved method of manufacturing reliable U-shaped conductor segments at a high productivity.

According to a feature of the invention, a method of manufacturing a U-shaped conductor segment includes a step of setting a straight conductor wire of a prescribed length on the outer peripheries of a pair of parallelly disposed rollers, and a step of pushing a bender against one side of the conductor wire opposite the rollers between the rollers so that the conductor wire can be bent to allow the bender to pass through between the pair of rollers.

The method may further comprise a step of reducing a gap between the pair of rollers when or after the step of pushing a bender. The step of reducing a gap may include a step of forming a gap between legs to be narrower than the gap of the head. In the step of pushing a bender may further include a step of holding the other side of the wire by a stopper while the bender passes through between the pair of rollers. In the step of pushing a bender may further include a step of inserting a spacer between the legs.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 7A is a schematic front view of forming rollers in a step of manufacturing the U-shaped conductor segments, and FIG. 7B is a schematic cross-sectional side view illustrating a former unit to be used in a method according to the invention;

DETAILED DESCRIPTION OF THE PREFERRED EMBODIMENTS

An AC generator for a vehicle that is equipped with a stator manufactured by a method according to a preferred embodiment of the invention is described with reference to FIGS. 1–6.

Figure 1:
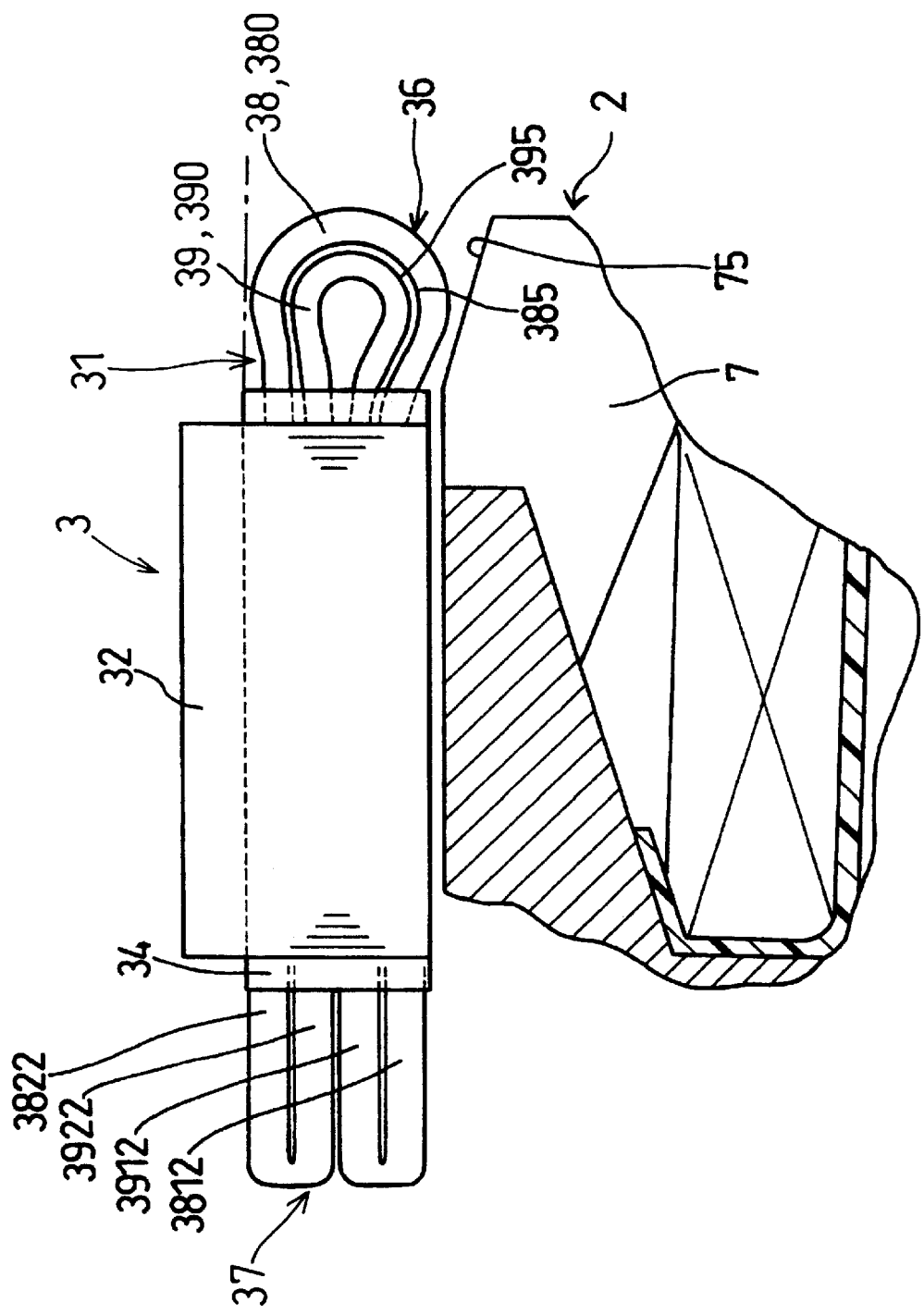
FIG. 1 is a fragmentary longitudinal cross-sectional view of a rotary electric machine having a stator with a stator winding being comprised of a plurality of U-shaped conductor segments.
Figure 2:
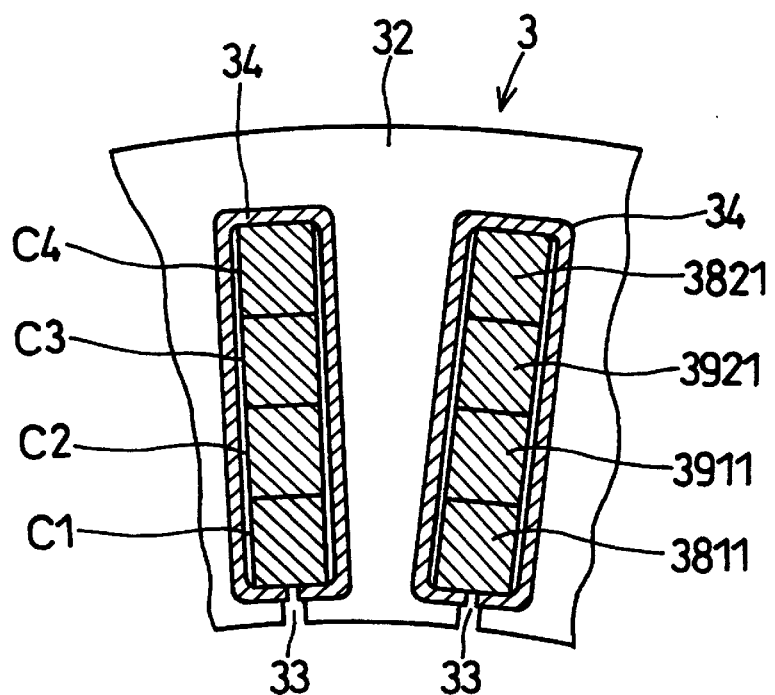
FIG. 2 is radial cross-sectional view of the stator winding shown in FIG. 1.

As shown in FIG. 1, stator 3 has three-phase stator winding 31 and stator core 32 and is disposed around pole core 7 of rotor 2. Stator core 32 has 96 slots in which stator winding 31 is accommodated. Insulators 34 are inserted into each slot 33 to insulate stator winding 31 from stator core 32. Stator winding 31 is comprised of a plurality of pairs of large U-shaped conductor segment 38 and small U-shaped conductor segment 39. As shown in FIG. 2, four in-slot portions 3811, 3911, 3921 and 3821 are respectively disposed in radially aligned slot layers C1, C2, C3 and C4.

Figure 3:
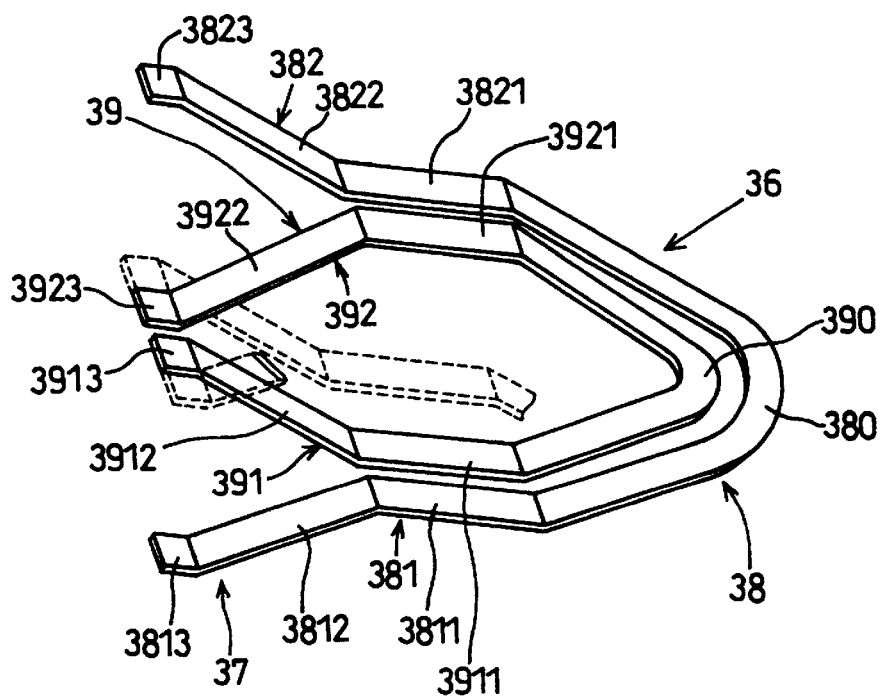
FIG. 3 is a perspective view illustrating a pair of U-shaped conductor segments.

As shown in FIG. 3, large U-shaped conductor segment 38 has U-turn head 380 and a pair of legs 381 and 382.

Leg 381 has in-slot portion 3811 to be disposed in layer C1 of one slot and extension 3812 having connection end 3813. Leg 382 has in-slot portion 3821 to be disposed in layer C4 of another slot and extension 3822 having connection end 3823. A circumferential interval is formed to correspond a prescribed pole-pitch between in-slot portion 3811 of leg 381 and in-slot portion 3821 of leg 382. Connection end 3813 is circumferentially spaced apart from in-slot portion 3811 by a half of the circumferential interval.

Connection end 3823 is also circumferentially spaced apart from in-slot portion 3821 by a half of the circumferential interval.

Small U-shaped conductor segment 39 has U-turn head 390 and a pair of legs 391 and 392. Leg 391 has in-slot portion 3911 to be disposed in layer C2 of the same slot as in-slot portion 3811 and extension 3912 having connection end 3913. Leg 392 has in-slot portion 3921 to be disposed in layer C3 of the same slot as in-slot portion 3821 and extension 3922 having connection end 3923. A circumferential interval is formed to correspond to a prescribed pole-pitch between, in-slot portion 3911 and in-slot portion 3921. Connection end 3913 or 3923 is circumferentially spaced apart from in-slot portion 3911 or 3921 by a half of the circumferential interval of U-turn head 390.

As stated above, in-slot portions 3811 and 3821 of each large U-shaped conductor segment 38 are respectively inserted into different slots which are spaced apart by the prescribed pole-pitch, and in-slot portions 3911 and 3921 of each small U-shaped conductor segment 39 are respectively inserted into different slots which are spaced apart by the same pole-pitch.

As shown in FIG. 1, large U-shaped conductor segment 38 surrounds small U-shaped conductor segment 39, at first coil-end portion 36 or the front end of stator core 32, thereby preventing conductor segments 38 and 39 from crossing each other.

Figure 4:
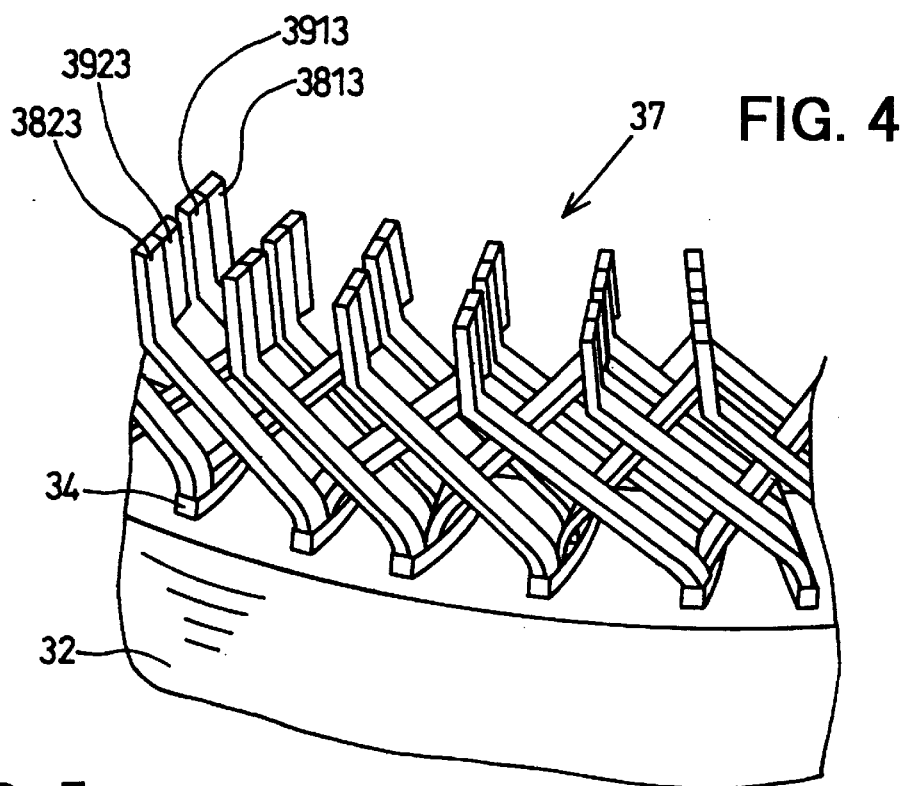
FIG. 4 is a fragmentary perspective view of a front end of the stator winding.

As shown in FIGS. 3 and 4, connection end 3813 extending from in-slot portion 3811 disposed at layer C1 is connected to connection end 3913 extending from in-slot portion 3911 disposed at layer C2, at second coil-end portion 37 or the rear end of stator core 32. In the same manner, connection end 3823 extending from in-slot portion 3821 disposed at layer C4 is connected to connection end 3923 extending from in-slot portion 3921 disposed at layer C3. First coil-end portion 36 includes common non-U-shaped conductor segments (not shown here) for connecting in-slot portions disposed at layers C1 and C4 and in-slot portions disposed at layers C2 and C3.

A method of manufacturing stator winding 31 is described hereafter.

At first, an insulation-resin-coated rectangular conductor wire is cut to have a prescribed length, and the insulation coatings at opposite ends thereof are removed. Thereafter, it is bent to form small U-shaped conductor segment 39 as shown in FIG. 5 or large U-shaped conductor segment 38 as shown in FIG. 6.

Figure 6:
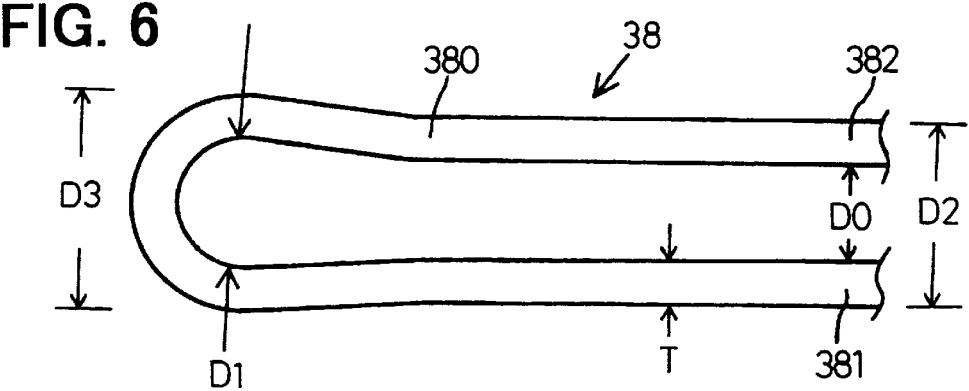
FIG. 6 is a fragmentary side view of a large U-shaped conductor segment.

As shown in FIG. 6, a gap D0 between legs 381 and 382 of large U-shaped conductor segment 38 is smaller than the diameter or maximum distance D1 of the inner periphery of head 380 in the same plane as the gap. If the thickness of the leg portion of large U-shaped conductor segment 38 in the same plane is T, the outside width D2 is D0+2T. The outside width D2 is smaller than the outside diameter or maximum width D3, which is D1+2T) of head 380 in the same plane.

Figure 5:
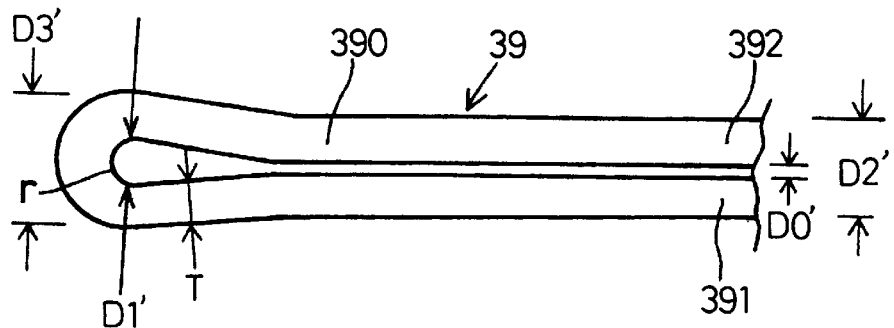
FIG. 5 is a fragmentary side view of a small U-shaped conductor segment.

As shown in FIG. 5, a gap D0' between legs 391 and 392 of small U-shaped conductor segment 39 is smaller than the diameter or maximum distance D1' of the inner periphery of head 390 in the same plane as the gap. If the thickness of the leg portion of small U-shaped conductor segment 39 in the same plane is T, the outside width D1' of the leg portions is D0'+2T. The outside width D1' is smaller than the outside diameter or maximum width D3' of head 390 in the same plane, which is D1'+2T. The maximum width D0' is almost 0, and the thickness T is a little smaller than the interval between the adjacent layers in slot 33.

In this stage, a pair of legs 381 and 382 of large U-shaped conductor segment 38 lies on the same radial plane as the gap D0, and a pair of legs 391 and 392 of small U-shaped conductor segment 39 lies on the same radial plane as the gap D0'.

Subsequently, the pair of legs 381 and 382 is bent in the circumferential direction of stator 3 to be spaced apart from each other at an interval with head 380 being at the center thereof. In the same manner, the pair of legs 391 and 392 is bent in the circumferential direction to be spaced apart from each other at an interval with head 390 being at the center thereof.

At this stage, radially inside leg 381 of large U-shaped conductor segment 38 is bent shorter than radially outside legs 382 thereof to respectively correspond to the radially inside layer C1 and radially outside layer C4 of the slot. In the same reason, radially inside leg 391 of small U-shaped conductor segment 39 is bent shorter than radially outside legs 382 thereof to respectively correspond to the radially inside layer C2 and radially outside layer C3 of the slot.

When the radially outside legs 382 and 392 are bent, the radially outside portion of head 380 and 390 are dragged more to be slightly flattened as compared with the radially inside portions of head 380 and 390 due to the difference between the amount to be bent discussed above.

Thereafter, legs 391 and 392 of small U-shaped conductor segment 39 are respectively inserted into two slots 33 which are spaced apart at a prescribed interval from each other, and legs 381 and 382 of large U-shaped conductor segment 38 are respectively inserted into two slots 33 which are spaced apart at a prescribed interval from each other, as stated above.

As shown in FIG. 4, portions of legs 381 and 382 extending forward from slots 33 are bent in the circumferential directions to form connection ends 3813 and 3823, and portions of legs 391 and 392 extending forward from slots 33 are bent in the circumferential directions to form connection ends 3913 and 3923. Then, connection ends 3913 and 3813 are put side by side in the radial direction, and connection ends 3923 and 3823 are put side by side in the radial direction. Thereafter, edge of connection end 3913 and edge of connection end 3813 are welded together, and edge of connection end 3923 and edge of connection end 3923 are welded together to form the stator 3. As shown in FIG. 1, head 380 of large U-shaped conductor segment 38 has radially inward surface extending in parallel to tapered surface 75 of rotor 2. This provide a sufficient space for first coil-end portion 36, head 380 and head 390, so that insulation coating at first coil-end portion 36 can be protected from excessive pressure applied thereto.

As shown in FIGS. 7A and 7B, a pair of forming rollers 101 having axis m is disposed in parallel to each other so that gap g is formed between the pair of parallel forming rollers 101. Each forming roller 101 has annular groove 1011 at its outer periphery to be in common line (e.g. one-dot chain line 400 in FIG. 11), and a flat or rectangular insulation-resin-coated wire 100 is set along each groove 1011. The insulation coating of wire 100 is removed from its opposite ends. Bender 102a, stopper 102b and spacer 103 are disposed at the back of wire 100 between the pair of forming rollers 101. They form a part of a former unit.

Bender 102a is a columnar member extending forward (to the left) from support 104 to be right above wire 100. Stopper 102b is a rectangular member extending forward from support 105 to be right below wire 100. Spacer 103 is a flat member disposed on support member 104 to extend forward in the vertical direction. Spacer 103 has slope portion 1030 down to the front.

As shown in FIG. 7B, wire 100 is carried backward or to the right by a wire carrier (not shown) from a storage position to the position right above annular groove 1011 and set therein, along one-dot chain line 200.

Preferably, the wire carrier is comprised of a pair of feed screws disposed both left and right sides of the pair of forming roller 101 shown in FIG. 7A. The pair of screws carries wire 100 between the threads thereof when it rotates. When wire 100 is carried by the pair of feed screws and is put in the annular grooves of the pair of forming rollers, the wire carrier stops. It is possible to carry wire 100 by robot hands.

Figure 8A:
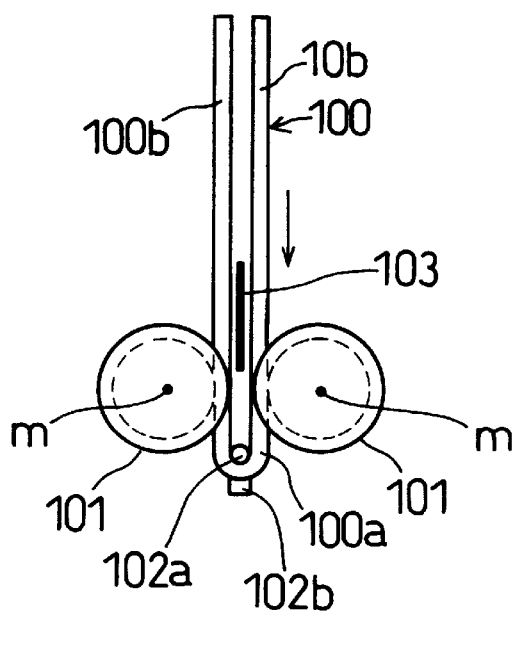
FIG. 8A is a schematic front view illustrating a pair of forming rollers in a step of manufacturing the U-shaped conductor segments.
Figure 8B:
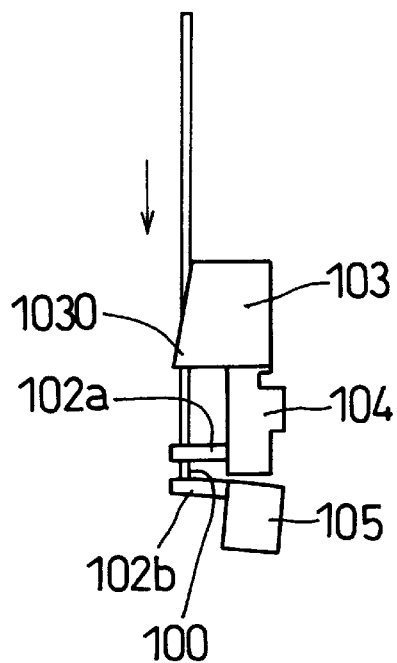
FIG. 8B is a schematic side view illustrating the former unit.
Figure 9:
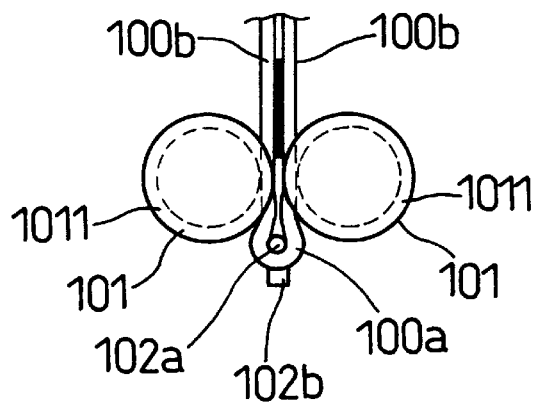
FIG. 9 is a schematic view illustrating a step of manufacturing the U-shaped conductor segments.

Then, the former unit, which includes bender 102a, stopper 102b, and spacer 103, is moved forward from the position shown in FIG. 7B to the position shown in FIG. 8B, so that wire 100 is set between bender 102a and stopper 102b as shown in FIG. 7A. At the same time slope portion 1030 of spacer 103 comes right above wire 100. Subsequently, the former unit moves down to bend wire 100 into a U-shape. When wire 100 is bent by bender 102a, stopper 102b supports a lower portion of wire 100 to prevent it from excessively bending to break the insulation coating.

Thereafter, the gap g between the forming rollers is reduced to narrow the neck portion between head 100a and legs 100b. On the other hand, spacer 103 holds a prescribed distance between two legs 100b. Bender 102a is also prevented from excessively reducing the radius of head 100a, thereby protecting the insulation coating of wire from stress.

Figure 10A:
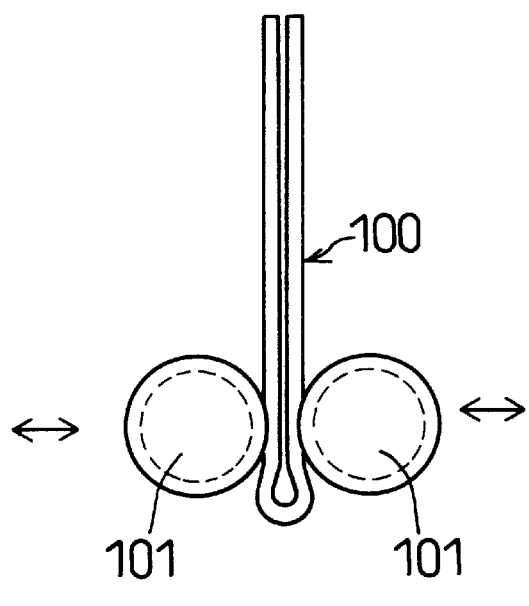
FIG. 10A is a schematic front view illustrating the forming rollers in a step of manufacturing the U-shaped conductor segments.
Figure 10B:
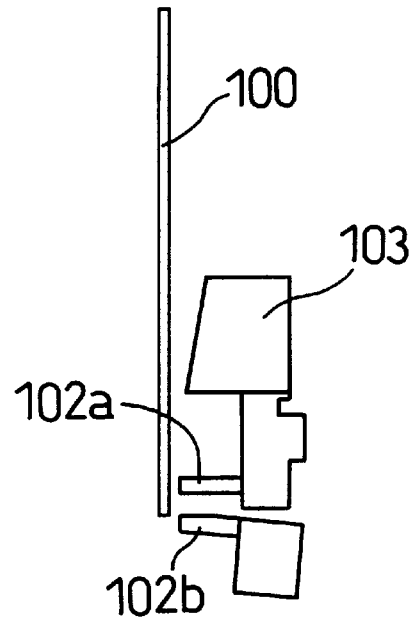
FIG. 10B is a schematic side view illustrating the former unit.

As shown in FIGS. 10A and 10B, one or each of the pair of forming rollers 101 is moved by roller mover 300 to increase the gap g. Subsequently, the former unit is moved backward to unload U-shaped wire 100.

Figure 11:
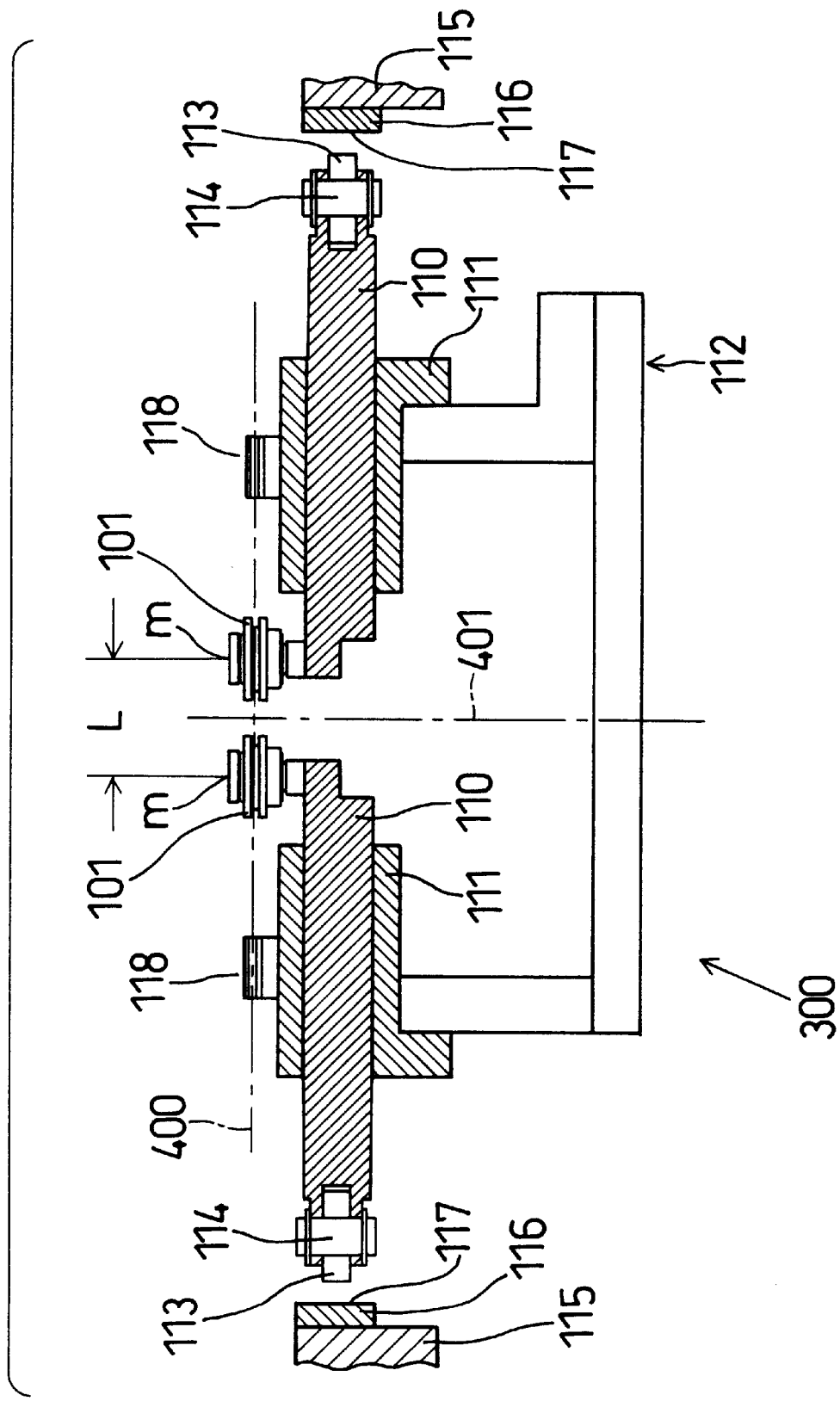
FIG. 11 is a schematic diagram illustrating a roller position control mechanism.

Roller mover 300 is shown in FIG. 11. The pair of forming rollers 101 is rotatably supported by a pair of support rods 110 which is aligned in a common axis. Each of the pair of support rods 110 is slidably supported by one of a pair of cylinders 111. Cylinder 111 is fixed to former-unit controller 700 shown in FIG. 12 via frame 112.

Each of a pair of cam followers 113 is supported at an end of each support rod 110. Each cam follower 113 has a shaft 114 fitted to an end of rod 110 in parallel with rotating axis 401.

A pair of ring-shaped cam supports 115 having cams 116 is fixed to a cam drum to be disposed around the pair of cam followers 113. The cam drum has a rotating axis parallel to rotating axis 401. Each cam 116 has cam face 117. Stoppers 118 are fixed to cylinders 111 to prevent further movement of wire 100.

The pair of rods 110 is biased by a spring to increase distance L until it is stopped by a stopper when the distance becomes equal to the distance between the axes m of forming rollers 101. If the distance g between the pair of forming rollers 101 is not decreased, each cam follower 113 is spaced apart from cam face 117. If cam face 117 pushes the pair of rods 110 against the spring force, the pair of forming rollers 101 moves from outside to reduce the distance g.

Figure 12:
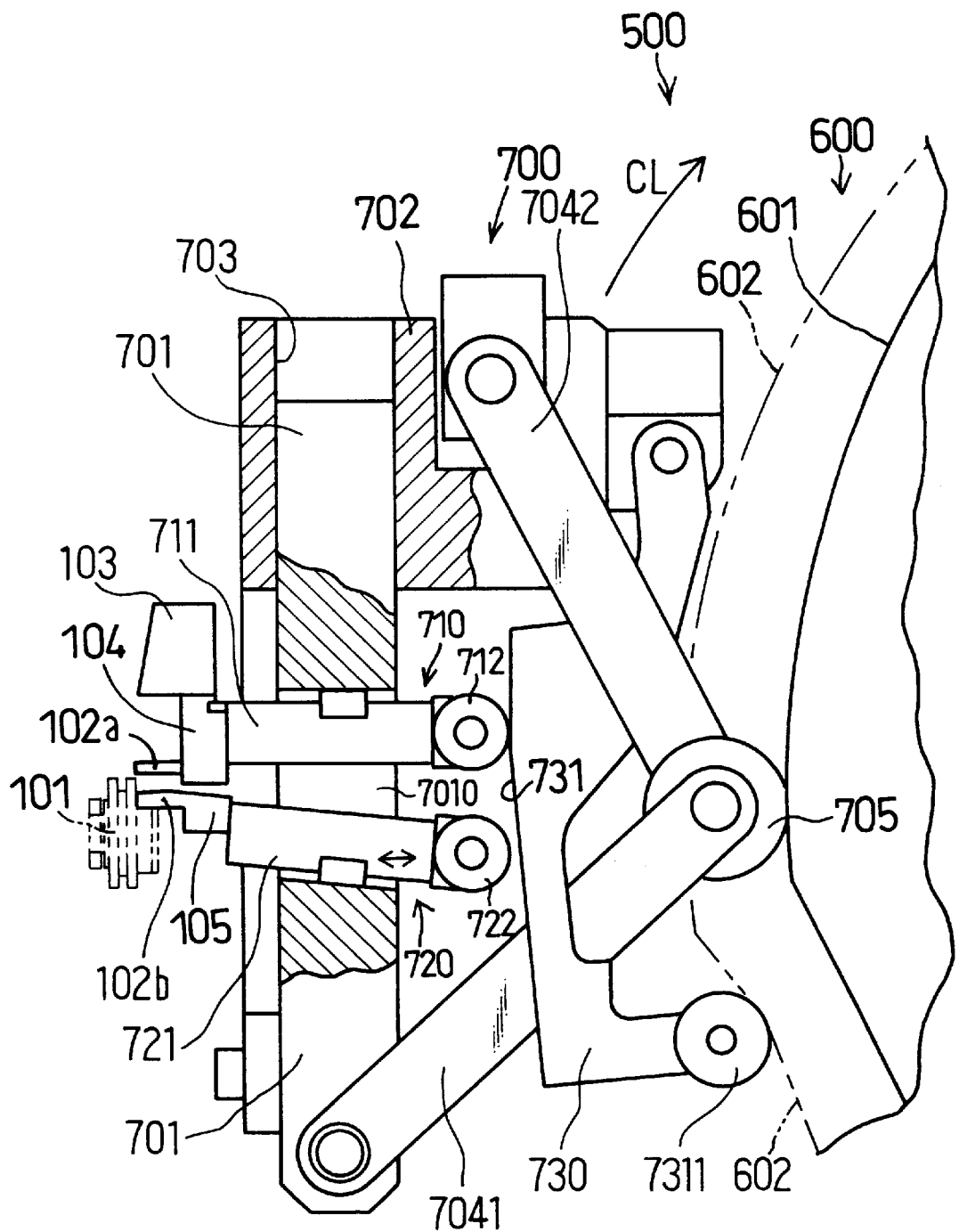
FIG. 12 is a fragmentary enlarged side view illustrating a former-unit control mechanism.

The former unit is comprised of bender 102a, stopper 102b, spacer 103, first support member driver 710, and second support member driver 720. The former unit is moved by former-unit controller 700, as shown in FIG. 12. Reference numeral 600 is the cam drum stated above. Former-unit controller 700 is a linkage rotating on a center axis parallel with the one-dot chain line 400 in FIG. 11 along the outer periphery of cam drum 600. Rotating axis 401 is one of radial lines that intersect the center axis.

Former-unit controller 700 is comprised of slider 701 and slider holder 702. Slider holder 701 has groove 703, into which slider 701 is inserted. Slider 701 is biased upward by a spring (not shown) in FIG. 12. An end of slider 701 is connected to holder 702 via link levers 7041 and 7042, which are connected to each other by a shaft of cam follower 705. Cam follower 705 is biased against cam face 601 of cam drum by a spring (not shown).

First support member driver 710 is comprised of plate 711, cam follower 712, and a spring for biasing plate 711 to the right (i.e. backward) in FIG. 12. Plate 711 is held to be slidable in through hole 7010 formed at the center of slider 701, and cam follower 712 is fixed to the right end of plate 711. On the other hand support plate 104 is fixed to the left end of plate 711. Bender 102a and spacer 103 are fixed to support plate 104, as stated above.

Second support member driver 720 is comprised of plate 721, cam follower 722, and a spring for biasing plate 721 to the right. Plate 721 is held in the same through hole 7010 formed at the center of slider 701 to be slidable, and cam follower 722 is fixed to the right end of plate 721. On the other hand, support plate 105 is fixed to the left end of plate 721. Stopper 102b is fixed to support plate 105, as stated above.

Cam followers 712 and 722 are respectively biased by the above stated springs to engage cam face 731 formed on link lever 730, which has cam follower 7311 biased by the above springs or a separate spring to engage with second cam face 602.

When former controller 700 is rotated clockwise by a rotation mechanism (not shown), as indicated by arrow CL, to move cam follower 705 along cam face 601 of cam drum 600, slider 701 is moved up and down by link lever 7041. Consequently, the former unit comprised of support member drivers 710 and 720, bender 102a, stopper 102b, and spacer 103, is moved up and down.

If cam follower 7311 is driven by second cam face 602 to move forward to the left while former controller 700 is rotated clockwise, link lever 730 rotates clockwise to push cam followers 712 and 722 to the left, thereby moving the forming unit forward. On the other hand, the former unit is moved back to the right if cam follower 7311 is driven by second cam face 602 to move backward.

Cam faces 601 and 602 are formed so that former controller 700 can execute the above operation when cam drum 600 has rotated each 180-degree in angle. When cam drum 600 has rotated half round, former controller 700 moves back bender 102a, stopper 102b, and spacer 103 to the right to unload a U-shaped conductor segment with the leg-side being down, so that U-shaped conductor segment can straddle a chute (not shown) by its own weight.

More controllers 700 equipped circumferentially, higher productivity can be expected.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A method of manufacturing a U-shaped conductor segment which has a U-shaped head and a pair of legs, comprising:

setting a straight conductor wire of a prescribed length on the outer peripheries of a pair of parallel rollers;

pushing a bender against one side of said straight conductor wire opposite said rollers between said rollers so that said straight conductor wire can be bent to allow said bender to pass between said pair of rollers; and reducing a gap between said pair of rollers when or after pushing said bender, wherein reducing said gap between said pair of rollers comprises forming a gap between said pair of legs to be narrower than a gap of said U-shaped head.

2. The method as claimed in claim 1, wherein pushing said bender further comprises holding the other side of said straight conductor wire by a stopper while said bender passes between said pair of rollers.

3. The method as claimed in claim 1, wherein pushing said bender further comprises inserting a spacer between said pair of legs.

4. The method as claimed in claim 1, wherein pushing said bender further comprises inserting a spacer between said pair of legs.

5. A method of manufacturing a U-shaped conductor segment which has a U-shaped head and a pair of legs, comprising:

setting a straight rectangular conductor wire of a prescribed length on a pair of parallel rollers;

pushing a former unit against one side of said straight rectangular conductor wire opposite said rollers at a portion between said rollers;

moving said former unit to pass through between said pair of rollers to bend said straight rectangular conductor wire into a U-shape; and reducing a gap between said pair of rollers when or after pushing said bender, wherein reducing said gap between said pair of rollers comprises forming a gap between said pair of legs to be narrower than a gap of said U-shaped head.

6. A method of manufacturing a U-shaped conductor segment which has a U-shaped head and a pair of legs, comprising:

setting a straight rectangular conductor wire of a prescribed length on a pair of parallel members;

pushing a former unit against one side of said straight rectangular conductor wire opposite said members at a portion between said members;

moving said portion to pass through between said pair of members to bend said straight rectangular conductor wire into a U-shaped segment having said U-shaped head and said pair of legs; and reducing a gap between said pair of members when or after pushing said bender, wherein reducing said gap between said pair of members comprises forming a gap between said pair of legs to be narrower than a gap of said U-shaped head.

7. The method as claimed in claim 6, further comprising reducing a gap between said pair of legs when or after pushing said one side of said straight rectangular conductor wire.

8. The method as claimed in claim 7, wherein reducing said gap comprises forming a gap between said pair of legs to be narrower than a gap inside said U-shaped head.

9. The method as claimed in claim 8, wherein pushing said one side of said straight rectangular conductor wire further comprises holding the other side of said straight rectangular conductor wire to prevent excessive bending while said portion passes through between said pair of members.

10. A method of manufacturing a U-shaped conductor segment which has a U-shaped head and a pair of legs, comprising:

setting a pair of parallel rollers at a prescribed gap therebetween;

setting a straight conductor wire of a prescribed length on a common side of said pair of rollers;

positioning a bender at an intermediate portion of said conductor wire disposed on said common side between said rollers;

pressing said bender against said intermediate portion to bend said conductor wire until said bender passes between said pair of rollers;

reducing said gap when or after said bender passes between said pair of rollers; and increasing said gap after said bender forms said U-shaped head.

11. The method as claimed in claim 10, wherein reducing said gap comprises inserting a spacer between said legs.

12. The method as claimed in claim 10, wherein pressing said bender comprises supporting said conductor wire thereby preventing said conductor wire from excessively bending.

13. A method of manufacturing a U-shaped conductor segment which has a U-shaped head and a pair of legs, comprising:

setting a pair of parallel rollers at a prescribed gap therebetween;

positioning a bender at an intermediate portion of a straight conductor wire disposed between said rollers;

reducing said gap when or after said bender passes between said pair of rollers; and increasing said gap after said bender forms said U-shaped head.

* * * * *